United States Patent
Tremblay et al.

(10) Patent No.: US 12,314,726 B2
(45) Date of Patent: May 27, 2025

(54) PERFORMANCE BENCHMARKING-BASED SELECTION OF PROCESSOR FOR GENERATING GRAPHIC PRIMITIVES

(71) Applicant: COREL CORPORATION, Ottawa (CA)

(72) Inventors: Christopher Tremblay, Cantley (CA); John Jason Kurczak, Ottawa (CA)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 18/457,112

(22) Filed: Aug. 28, 2023

(65) Prior Publication Data
US 2023/0401070 A1 Dec. 14, 2023

Related U.S. Application Data

(63) Continuation of application No. 17/962,277, filed on Oct. 7, 2022, now Pat. No. 11,755,332, which is a continuation of application No. 16/870,051, filed on May 8, 2020, now Pat. No. 11,474,824.

(51) Int. Cl.
| | |
|---|---|
| *G06F 9/38* | (2018.01) |
| *G06F 9/30* | (2018.01) |
| *G06F 11/30* | (2006.01) |
| *G06F 11/34* | (2006.01) |
| *G06T 1/20* | (2006.01) |

(52) U.S. Cl.
CPC ........ *G06F 9/3877* (2013.01); *G06F 9/30065* (2013.01); *G06F 11/3024* (2013.01); *G06F 11/3428* (2013.01); *G06T 1/20* (2013.01)

(58) Field of Classification Search
CPC ............... G06F 9/3877; G06F 9/30065; G06F 11/3024; G06F 11/3428; G06T 1/20
USPC ......................................................... 712/220
See application file for complete search history.

(56) References Cited

U.S. PATENT DOCUMENTS

| | | | |
|---|---|---|---|
| 8,572,407 B1 | 10/2013 | Chengottarasappan et al. | |
| 2011/0252411 A1 | 10/2011 | Martin et al. | |
| 2012/0149464 A1* | 6/2012 | Bone ..................... | G06F 9/5044 463/30 |

(Continued)

OTHER PUBLICATIONS

Corel Painter 2021—User Guide https://product.corel.com/help/Painter/540111140/Main/Contents/Resources/en.lproj/Corel-Painter-2021.pdf.

(Continued)

*Primary Examiner* — Chun Kuan Lee
(74) *Attorney, Agent, or Firm* — Rosenberg, Klein & Lee (57) ABSTRACT

Systems and methods for performance benchmarking-based selection of processor for generating graphic primitives. An example method comprises: initializing, by a computer system comprising a plurality of processors of a plurality of processor types, a current value of a graphic primitive parameter; for each processor type of the plurality of processor types, computing a corresponding value of a performance metric by generating, using at least one processor of a currently selected processor type, a corresponding graphic primitive of a specified graphic primitive type, wherein the graphic primitive is characterized by the current value of the graphic primitive parameter; and estimating, based on the computed performance metric values, a threshold value of the graphic primitive parameter.

14 Claims, 4 Drawing Sheets

(56) References Cited

U.S. PATENT DOCUMENTS

| | | | |
|---|---|---|---|
| 2014/0189708 A1* | 7/2014 | Lee | G06F 9/505 |
| | | | 718/104 |
| 2014/0327686 A1 | 11/2014 | Jia | |
| 2017/0153926 A1 | 6/2017 | Callegari et al. | |
| 2017/0264769 A1* | 9/2017 | Tajima | G06T 1/20 |
| 2021/0232399 A1 | 7/2021 | Yang et al. | |

OTHER PUBLICATIONS

Corel Painter 2021—Quick Start Guide https://manuals.corel.sklep.pl/Painter2021/Corel-Painter-2021-przewodnik_EN.pdf.

\* cited by examiner

PERFORMANCE BENCHMARKING-BASED SELECTION OF PROCESSOR FOR GENERATING GRAPHIC PRIMITIVES

CROSS-REFERENCE TO RELATED APPLICATIONS

This patent application claims the benefit of priority as a continuation of U.S. patent application Ser. No. 17/962,277 filed Oct. 7, 2022; which itself claims the benefit of priority from U.S. patent application Ser. No. 16/870,051 filed May 8, 2020 which has issued as U.S. Pat. No. 11,474,824; the entire contents of each being incorporated herein by reference.

TECHNICAL FIELD

The present disclosure is generally related to computer systems, and is specifically related to systems and methods for performance benchmarking-based selection of a processor for generating graphic primitives.

BACKGROUND

Modern computing devices, ranging from smartphones to desktop computers, are often equipped not only with multiple processors, but also with multiple processor types. A typical configuration includes both general purpose processors, or central processing units (CPUs), and graphics processing units (GPUs).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for performance benchmarking-based selection of a processor for generating graphic primitives.

A typical configuration of a modern computing device (e.g., a smartphone, a desktop computer) includes processors of multiple processor types, including, e.g., general purpose processors (CPUs) and graphics processing units (GPUs). In various illustrative examples, computing devices may further include digital signal processors (DSPs), tensor cores, and/or various other application-specific integrated circuits (ASIC) chips designed to efficiently perform respective specified tasks. Often, rasterized representations of some graphic primitives (such as brushstrokes, fill patterns, shading patterns, digital image filters and effects, point model simulations, textures, etc.) may be generated by various processor types. For example, while one processor type (e.g., a CPU) may often exhibit lower latency as compared to another processor type (e.g., a GPU), on the other hand, the CPU would also exhibit lower throughput. Furthermore, the relative performance of one processor type vs. another processor type (e.g., CPU vs. GPU) may depend upon various parameters (such as the size) of the graphic primitives being generated. In other words, the same graphic primitive may be more efficiently generated by a certain processor type depending upon the size and/or other parameters of the graphic primitive.

The systems and methods of the present disclosure allow benchmark-based selection of a processor type among multiple processor types available on a given computer system (e.g., a CPU or a GPU) for generating a certain graphic primitive of a specified size. In some implementations, performance benchmarking may be run for a graphic primitive of a specified type (e.g., a brushstroke, a fill pattern, a shading pattern, a digital image filter, a digital image effect, or a texture). The performance benchmarking may involve generating the graphic primitive using different available processor types, while varying the values of one or more specified parameters of the graphic primitive (e.g., varying the size of graphic primitive) in order to determine the threshold value(s) of the parameter(s), at which two or more processors being compared (i.e., the CPU and the GPU) would demonstrate substantially equal performance (i.e., their respective performance metrics would differ by no more than a predetermined performance metric threshold). Therefore, one of the processors being compared (e.g., the CPU) would outperform other processors (e.g., the GPU) if the parameter value(s) of the graphic primitive being generated are below the identified threshold value(s), while another processor (e.g., the GPU) would outperform the first one (e.g., the CPU) if the parameter value(s) exceed the identified threshold value(s).

In an illustrative example, a computer system including multiple processors of several processor types, may iterate through two or more processor types in order to generate, using at least one processor of the currently selected processor type, multiple graphic primitives of a predefined primitive type (e.g., a brushstroke) that would differ by a value of a predefined graphic primitive parameter (e.g., the size of the brushstroke), thus yielding a corresponding value of a predefined performance metric for the currently selected processor type. The computer system may then estimate, based the computed performance metric values, the threshold value of the graphic primitive parameter, at which one processor type would outperform other processor types. Accordingly, when a command is received to render a graphic primitive of the same graphic primitive type, the computer system may compare the graphic primitive parameter value to the pre-computed threshold value and select the processor type that is most suitable for efficiently generated the specified graphic primitive, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 1:
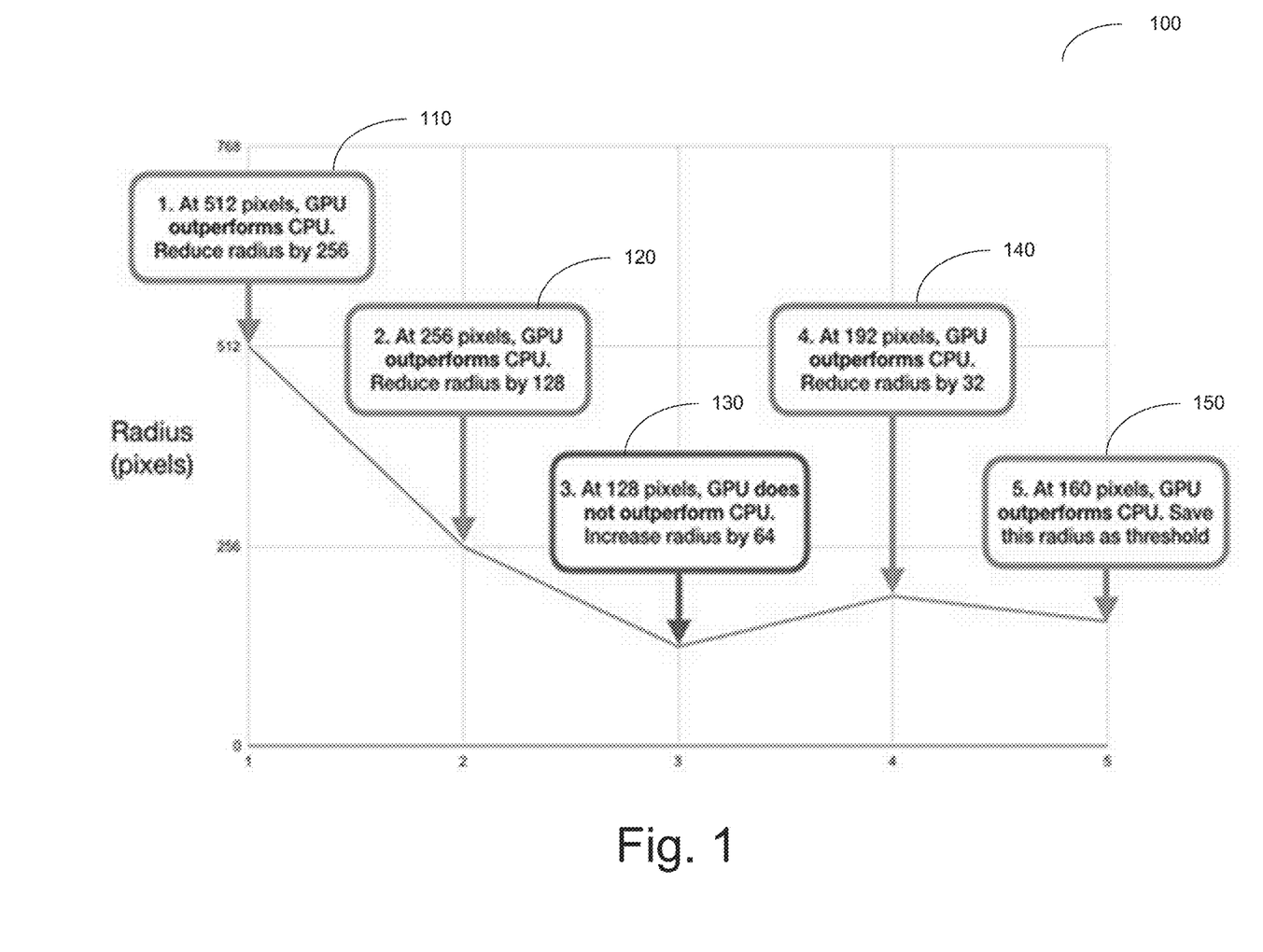
FIG. 1 schematically illustrates an example workflow for performance benchmarking-based selection of processor for generating graphic primitives, in accordance with one or more aspects of the present disclosure.

FIG. 1 schematically illustrates an example workflow for performance benchmarking-based selection of processor for generating graphic primitives, in accordance with one or more aspects of the present disclosure. The example workflow may be implemented by a computer system (e.g., the computer system 1000 of FIG. 4) that includes both general purpose processors (CPUs) and graphics processing units (GPUs). In some implementations, the computer system implementing the example workflow of FIG. 1, may run various graphics-rendering applications, such as an interactive graphics editor that receives the input via one or more input devices (e.g., a touchscreen, a pointing device, and/or a keyboard), generates various graphics objects based on the received input, and renders the generated graphics objects on one or more graphical user interface (GUI) output devices, such as displays, printers, etc.

The computer system running a graphics-rendering application may receive, via the GUI, a command for generating and rendering a certain graphic primitive. Examples of graphic primitive types and other workloads that can be analyzed by the systems and methods of the present disclosure include:
  brushstrokes;
  digital image filters and effects (e.g., Gaussian blur, color transform);
  rendering paint layers using various shading algorithms (e.g., Phong, Lambert, ambient occlusion, etc.);
  combining layered images together for rendering; and
  texture synthesis (e.g., generating new images that appear similar to a smaller input image).

The command may further specify the values of one or more parameters of the graphic primitive (e.g., the graphic primitive size, the distance between adjacent graphic primitives, painting destination, paint blending, etc.).

As noted herein above, rasterized representations of some graphic primitives may be generated by different processor types. Furthermore, the relative performance of a one processor type vs. another processor type may depend upon various parameters (such as the size) of the graphic primitives being generated.

In an illustrative example, the graphics-rendering application may perform stamp-brushing, which refers to a technique of sequentially applying multiple partially overlapping "stamps" of a specified pattern to the digital canvas, along a specified direction, thus producing visual appearance of a continuous brush stroke. The stamp may be characterized by its radius (e.g., measured in pixels), which is also referred to as "brush radius." The graphic primitive may be further characterized by the spacing (i.e., the distance between the adjacent primitives), the painting destination (e.g., a canvas or a layer), the paint blending, the presence of selection masks in the document, the type of graphic algorithm being used (e.g., the "pen type" setting, such as wet, alpha blend, subtractive). In some implementations, the graphic primitive may be further characterized by various other parameters, such as the computer power status (operating on battery vs. plugged into an electric grid), or existing computational load on each processor.

The computer system may select the processor type among the available two or more processor types (e.g., GPU or CPU) for generating the specified graphic primitive in the most efficient manner. In some implementations, the selection may be performed based on processor performance benchmarking comparing the performance of two or more processor types (e.g., GPU and CPU) in generating graphic primitives of the specified type with various values of one or more parameters characterizing the graphic primitive (e.g., the graphic primitive size).

In an illustrative example, the performance benchmarking may be performed responsive to receiving a GUI command to render a specified primitive. In another illustrative example, the performance benchmarking may be performed upon initialization of the graphic-rendering application running on the computer system. In yet another illustrative example, the performance benchmarking may be performed upon detecting a hardware configuration event in the computer system (e.g., a processor being hot-plugged or removed, or a memory device being hot-plugged or removed).

The performance benchmarking may involve generating the graphic primitive multiple times, while varying the values of one or more specified parameters of the graphic primitive (e.g., varying the radius of the brushstroke) in order to determine the threshold value(s) of the parameter(s), at which two or more processors being compared (i.e., the CPU and the GPU) would demonstrate substantially equal performance (i.e., their respective performance metrics would differ by no more than a certain performance metric accuracy threshold), such that the following condition would be satisfied:

$$|P_i(v)-P_j(v)|<T \text{ for } i=1,\ldots,n; j=1,\ldots,n; i \neq j$$

where $P_i$ and $P_j$ are performance metrics of the processors being compared, n is the number of processor types, v is the vector of parameter values of the graphic primitive being generated, T is the performance metric accuracy threshold, and

|x| denotes the absolute value of the argument x.

In various illustrative examples, the performance metric may be represented by the period of time for generating the specified graphic primitive, the total size of one or more memory buffers utilized for generating the first graphic primitive. In some implementations, the performance metric may be represented by a specified function reflecting each of the above-referenced metrics or their combination (e.g., a weighted sum of the period of time for generating the specified graphic primitive and the total size of one or more memory buffers utilized for generating the first graphic primitive).

Therefore, one of the two or more processors being compared (e.g., the CPU) would outperform other processor(s) (e.g., the GPU) if the parameter value(s) of the graphic primitive being generated are below the identified threshold value(s), while the other processor(s) (e.g., the GPU) would outperform the first one (e.g., the CPU) if the parameter value(s) exceed the identified threshold value(s). Stated differently, the identified threshold value(s) of the graphic primitive being generated would define a dividing hyperplane within the hyperspace of the parameters, such that one of the two or more processors being compared (e.g., the CPU) would outperform other processor(s) (e.g., the GPU) if the parameter value(s) are located on one side of the hyperplane within the parameter hyperspace, while the other processor(s) (e.g., the GPU) would outperform the first one (e.g., the CPU) if the parameter value(s) are located on the other side of the hyperplane within the parameter hyperspace.

In some implementations, the computer system may implement a bisection-based method for identifying the threshold value(s) of the parameter(s), at which the processors being compared (i.e., the CPU and the GPU) would demonstrate substantially equal performance. The method involves specifying an initial interval defined by two parameter values of the graphic primitive being generated, such that the difference between performance metrics of the two processors changes the sign (e.g., from positive to negative or vice versa) within the initial interval, and iteratively bisecting the interval and then selecting the subinterval in which the difference between performance metrics of the processors changes the sign, and therefore contains the threshold performance metric value. The iterations may continue until the specified number of iterations have been performed and/or until the size of the interval falls below a predetermined accuracy threshold.

As schematically illustrated by FIG. 1, the example workflow for determining the threshold brushstroke radius at which two or more processors (e.g., the GPU and the CPU) exhibit substantially similar performance metrics, starts (operation 110) by measuring the performance metric of the CPU generating the specified graphic primitive (i.e., the brushstroke) having the initial brushstroke radius of 512 pixels and the performance metric of the GPU generating the specified graphic primitive having the initial brushstroke radius, under the assumption that the difference between performance metrics of the two processors changes the sign within the brushstroke radius interval of [0; 512] pixels.

In some implementations, the computer system may, at each iteration, generate the graphic primitive with the specified parameter values two or more times, and then determine an aggregate value (e.g., the average, minimum, or maximum value) representative of the processor performance at the specified parameter value, thus decreasing the adverse effect on the result of possible fluctuations in availability of various hardware resources (e.g., processor, memory) at the time of performing the benchmarking.

Responsive to determining that the performance metric value exhibited by the GPU falls below the performance metric value exhibited by the CPU, the computer system may bisect the initial interval of [0; 512], thus producing the brushstroke radius of 256 pixels to be utilized by the next iteration.

The next iteration (operation 120) may involve measuring the performance metric of the CPU generating the specified graphic primitive (i.e., the brushstroke) having the brushstroke radius of 256 pixels and the performance metric of the GPU generating the specified graphic primitive having the same brushstroke radius.

Responsive to determining (operation 120) that the performance metric value exhibited by the GPU falls below the performance metric value exhibited by the CPU, the computer system may determine that the difference between performance metrics of the two processors changes the sign within the brushstroke radius interval of [0; 256] pixels. Accordingly, the computer system may bisect the interval of [0; 256], thus producing the brushstroke radius of 128 pixels to be utilized by the next iteration.

Accordingly, the next iteration (operation 130) may involve measuring the performance metric of the CPU generating the specified graphic primitive (i.e., the brushstroke) having the brushstroke radius of 128 pixels and the performance metric of the GPU generating the specified graphic primitive having the same brushstroke radius.

Responsive to determining that the performance metric value exhibited by the GPU exceeds the performance metric value exhibited by the CPU, the computer system may determine that the difference between performance metrics of the two processors changes the sign within the brushstroke radius interval of [128; 256] pixels. Accordingly, the computer system may bisect the identified interval of [128; 256], thus producing the brushstroke radius of 192 pixels to be utilized by the next iteration.

Therefore, the next iteration (operation 140) may involve measuring the performance metric of the CPU generating the specified graphic primitive (i.e., the brushstroke) having the brushstroke radius of 192 pixels and the performance metric of the GPU generating the specified graphic primitive having the same brushstroke radius.

Responsive to determining that the performance metric value exhibited by the GPU falls below the performance metric value exhibited by the CPU, the computer system may determine that the difference between performance metrics of the two processors changes the sign within the brushstroke radius interval of [128; 192] pixels. Accordingly, the computer system may bisect the identified interval of [128; 192], thus producing the brushstroke radius of 160 pixels.

Responsive to determining that a predetermined number of iterations have been performed and/or the size of the interval falls below a predetermined accuracy threshold, the computer system may break the cycle of iterations and utilize the brushstroke radius of 160 pixels as the threshold value of the brushstroke radius.

The graphics rendering application may utilize the identified threshold parameter value for selecting the processor type for generating one or more graphic primitives of the specified type. In an illustrative example, the graphics rendering application may compare the desired value of the parameter of the graphic primitive to be rendered (e.g., as specified by a GUI command) to the computed threshold parameter value, and select the processor type (e.g., CPU or GPU) based on the result of the comparison (e.g., if the desired parameter value exceeds the threshold parameter value, a GPU is selected, otherwise, a CPU is selected, or vice versa).

White the illustrative example of FIG. 1 compares performance of a GPU and a CPU, the systems and methods of the present disclosure are also applicable to other types of processors (e.g., DSPs, tensor cores, and/or various other ASIC chips designed to efficiently perform respective specified tasks) and/or to computer systems including processors of multiple processor types (e.g., two or more processor types).

Figure 2:
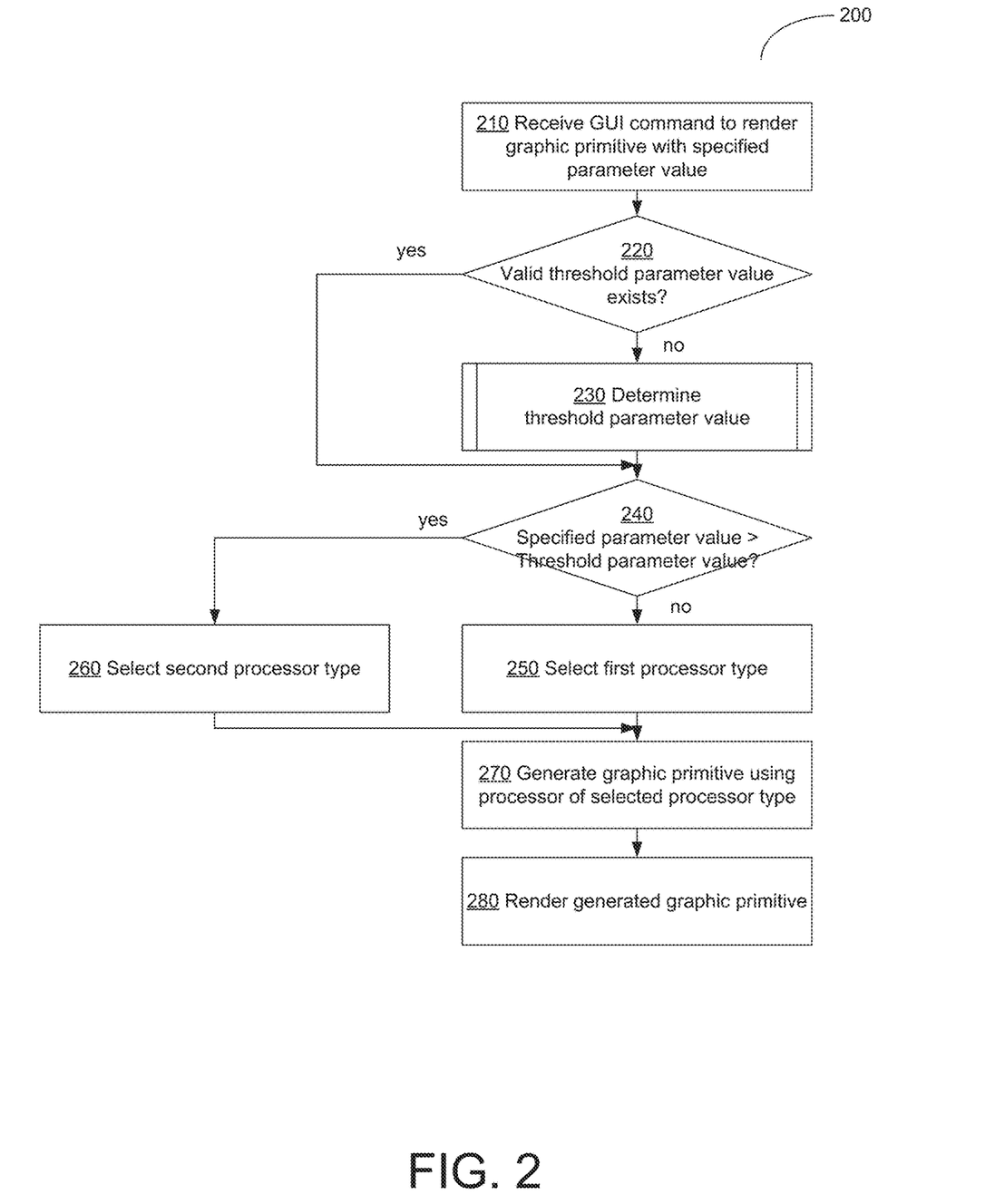
FIG. 2 depicts a flow diagram of an example method 200 for generating graphic primitives based on performance benchmarking-based processor selection technique.

FIG. 2 depicts a flow diagram of an example method 200 for generating graphic primitives based on performance benchmarking-based processor selection technique, in accordance with one or more aspects of the present disclosure. Method 200 and/or each of its individual functions, routines, subroutines, or operations may be performed by one or more processors of the computer system (e.g., computer system 1000 of FIG. 4) implementing the method. In some implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other.

At block 210, the computer system implementing the method receives, via a GUI, a command to render a graphic primitive. The command may specify the type of the graphic primitive (e.g., a brushstroke, a fill patterns, or a shadow pattern). The command may further specify values of one or more parameters of the graphic primitive (e.g., the size of the graphic primitive).

Responsive to determining, at block 220, that a valid threshold parameter value exists for the specified type of the graphic primitive, the method branches to block 240; otherwise, the processing continues at block 230.

At block 230, the computer system performs performance benchmarking for determining a threshold parameter value for the specified type of the graphic primitive, i.e., a parameter value. The performance benchmarking may involve generating multiple graphic primitives of the specified type, while varying the values of the specified parameter of the graphic primitive (e.g., varying the brushstroke size), until a parameter value is identified at which the processors being compared (i.e., a CPU and a GPU) would demonstrate substantially equal performance (i.e., their respective performance metrics would differ by no more than a predetermined performance metric threshold).

Responsive to determining, at block 240, that the specified parameter value exceeds the threshold parameter value, the method branches to block 260; otherwise, the processing continues at block 250.

A block 250, the computer system selects the first processor type (e.g., a GPU) for generating the specified graphic primitive, and the processing continues at block 270.

A block 260, the computer system selects the second processor type (e.g., a CPU) for generating the specified graphic primitive.

At block 270, the computer system generates the specified graphic primitive using the selected processor type.

At block 280, the computer system renders, via the GUI, the generated graphic primitive, and the method terminates.

White the illustrative example of FIG. 2 compares performance of a GPU and a CPU, the systems and methods of the present disclosure are also applicable to other types of processors (e.g., DSPs, tensor cores, and/or various other ASIC chips designed to efficiently perform respective specified tasks) and/or to computer systems including processors of multiple processor types (e.g., two or more processor types). In some implementations, a computer system including multiple processors of several processor types, may iterate through two or more processor types in order to generate, using at least one processor of the currently selected processor type, multiple graphic primitives of a predefined primitive type (e.g., a brushstroke) that would differ by a value of a predefined graphic primitive parameter (e.g., the size of the brushstroke), thus yielding a corresponding value of a predefined performance metric for the currently selected processor type. The computer system may then estimate, based the computed performance metric values, the threshold value of the graphic primitive parameter, at which one processor type would outperform other processor types. Accordingly, when a command is received to render a graphic primitive of the same graphic primitive type, the computer system may compare the graphic primitive parameter value to the pre-computed threshold value and select the processor type that is most suitable for efficiently generated the specified graphic primitive.

Figure 3:
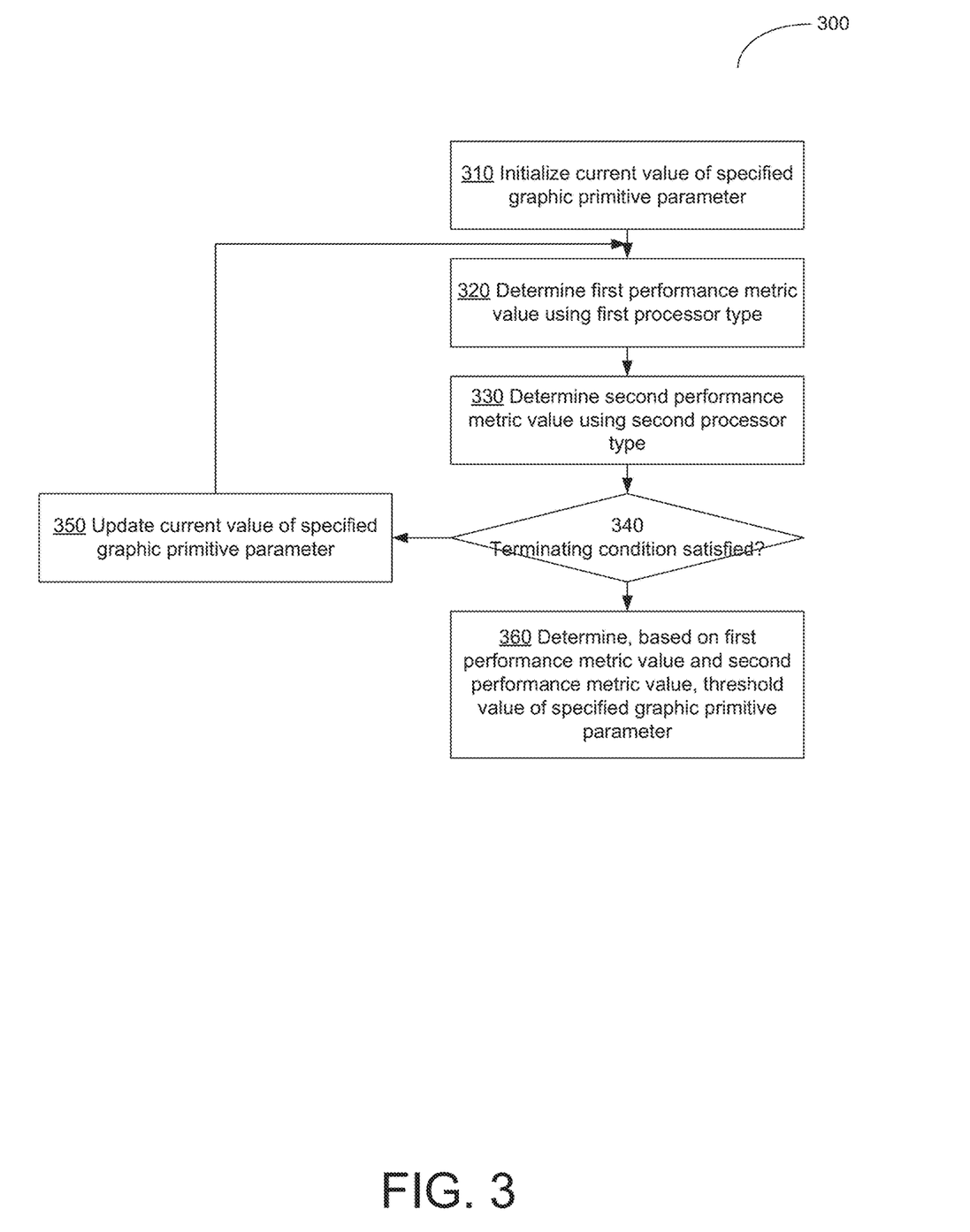
FIG. 3 depicts a flow diagram of an example method 300 for determining the threshold parameter value for generating graphic primitives of a certain type, in accordance with one or more aspects of the present disclosure.

FIG. 3 depicts a flow diagram of an example method 300 for determining the threshold parameter value for generating graphic primitives of a certain type, in accordance with one or more aspects of the present disclosure. Method 300 and/or each of its individual functions, routines, subroutines, or operations may be performed by one or more processors of the computer system (e.g., computer system 1000 of FIG. 4) implementing the method. In some implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method initializes the current value of a parameter (e.g., the size) of a specified graphic primitive type (e.g., a brushstroke).

At block 320, the computer system implementing the method determines the first processor performance metric value by generating, using the first processor type (e.g., a GPU), a graphic primitive of the specified type (e.g., a brushstroke), using the current value of the specified parameter (e.g., the size of the brushstroke).

At block 330, the computer system determines the second processor performance metric value by generating, using the second processor type (e.g., a CPU), a graphic primitive of the specified type, using the current value of the specified parameter.

Responsive to determining, at block 340, that a terminating condition has been satisfied, the processing continues at block 360; otherwise, the method branches to block 350. In an illustrative example, the terminating condition may specify the maximum number of iterations to be performed. In another illustrative example, the terminating condition may specify the desired accuracy threshold of the performance metric, as explained in more detail herein above.

At block 350, the computer system determines, by comparing the first performance metric value and the second performance metric value, a new current value of the specified parameter of the graphic primitive, and the method loops back to block 320. In an illustrative example, the computer system may implement a bisection-based method for identifying the threshold value of the specified parameter of the graphic primitive. The method may involve specifying an initial interval defined by two parameter values of the graphic primitive being generated, such that the difference between performance metrics of the two processors changes the sign (e.g., from positive to negative or vice versa) within the initial interval, and iteratively bisecting the interval and then selecting the subinterval in which the difference between performance metrics of the two processors changes the sign, and therefore contains the threshold performance metric value, as described in more detail herein above.

At block 360, the computer system determines, based on the first performance metric value and the second performance metric value, a threshold value of the specified parameter, at which the two processors being compared (i.e., the CPU and the GPU) would demonstrate substantially equal performance (i.e., their respective performance metrics would differ by no more than a predetermined performance metric threshold). In an illustrative example, the computer system may select the average of the previous parameter value and the current parameter value as the threshold parameter value. Responsive to completing the operations of block 360, the method terminates.

White the illustrative example of FIG. 3 compares performance of a GPU and a CPU, the systems and methods of the present disclosure are also applicable to other types of processors (e.g., DSPs, tensor cores, and/or various other ASIC chips designed to efficiently perform respective specified tasks) and/or to computer systems including processors of multiple processor types (e.g., two or more processor types).

Figure 4:
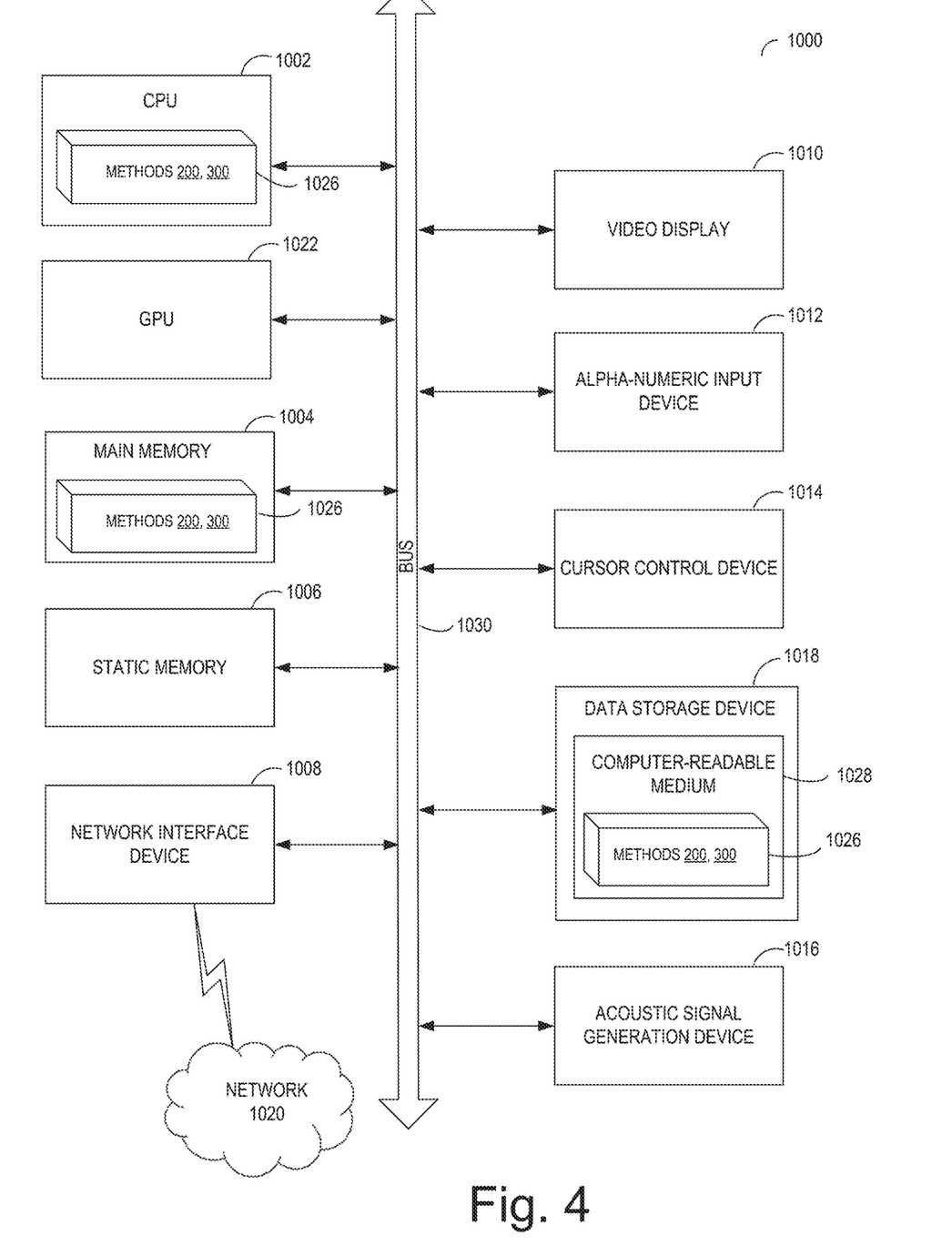
FIG. 4 depicts a block diagram of an example computer system operating in accordance with one or more aspects of the present disclosure.

FIG. 4 schematically illustrates a component diagram of an example computer system 1000 which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a central processing unit (CPU) 1002 (also referred to as a processor), a graphics processing unit (GPU) 1022, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

CPU 1002 represents one or more general-purpose processing devices such as a microprocessor, central processing unit, or the like. More particularly, CPU 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets.

CPU 1002 and/or GPU 1022 may be employed to execute instructions implementing method 200 of generating graphic primitives based on performance benchmarking-based processor selection technique and/or method 300 of determining the threshold parameter value for generating graphic primitives of a certain type, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. Executable instructions 1026 may comprise executable instructions encoding various functions of method 200 of generating graphic primitives based on performance benchmarking-based processor selection technique and/or method 300 of determining the threshold parameter value for generating graphic primitives of a certain type, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required operations, functions, or methods. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving upon a computer system comprising a pair of processors a command to render a graphic primitive, the command specifying a type of the graphic primitive and values of one or more parameters of the graphic primitive;
   determining whether a threshold parameter value exists with respect to a parameter of the one or more parameters of the graphic primitive;
   upon a positive determination that the threshold parameter value exists with respect to a parameter of the one or more parameters of the graphic primitive determining whether a value of the parameter for which the threshold parameter value exists exceeds the threshold parameter value; and
   upon determining the value of the parameter for which the threshold parameter value exists exceeds the threshold parameter value selecting a processor of the pair of processors for generating the graphic primitive; and
   upon determining the value of the parameter for which the threshold parameter value exists does not exceed the threshold parameter value selecting the other processor of the pair of processors for generating the graphic primitive; wherein
   the threshold parameter value of the parameter of the one or more parameters of the graphic primitive was established by executing, upon the computer system, a performance benchmarking process, the performance benchmarking process comprising:
      generating the graphic primitive multiple times with the pair of processors of the computer system whilst varying the parameter of the one or more parameters of the graphic primitive in order to determine the threshold parameter value of the parameter of the one or more parameters of the graphic primitive; and
      storing the threshold parameter value of the parameter of the one or more parameters of the graphic primitive and the parameter of the one or more parameters of the graphic primitive threshold value within a memory accessible to the computer system; wherein
   below the threshold value the other processor of the pair of processors outperforms the processor of the pair of processors and above the threshold value the processor of the pair of processors outperforms the other processor of the pair of processors; and
   the determination of whether one of the processor of the pair of processors and the other processor of the pair of processors outperforms the one of the other processor of the pair of processors and the processor of the pair of processors is established in dependence upon a performance metric for generating and rendering the graphic primitive for a value of the parameter value.

2. The method according to claim 1, wherein
   the processor of the pair of processors and the other processor of the pair of processors are different processor types.

3. The method of claim 1, wherein
   the threshold parameter value is defined in dependence upon a value of the parameter of the one or more parameters at which the pair of processors demonstrate values of a performance metric differing by less than a performance metric accuracy threshold.

4. The method according to claim 1, wherein
   the graphic primitive is one of:
      a brushstroke within the graphic-rendering application;
      rendering a paint layer within the graphic-rendering application using a shading algorithm;
      combining layered images within the graphic rendering application for rendering;
      a digital image filter;
      a digital image effect; and
      a texture synthesis.

5. The method according to claim 1, wherein
   the performance benchmarking process further comprises:
      terminating the performance benchmarking process upon a terminating condition being met;
   the sets of parameters for each iteration are established in dependence upon the performance metrics for the plurality of processors such that the performance benchmarking process iterates towards a common performance metric for the plurality of processors; and
   the terminating condition is a maximum number of iterations.

6. The method according to claim 1, wherein
   the performance benchmarking process further comprises:
      terminating the performance benchmarking process upon a terminating condition being met;
   the sets of parameters for each iteration are established in dependence upon the performance metrics for the plurality of processors such that the performance benchmarking process iterates towards a common performance metric for the plurality of processors; and
   the terminating condition is the performance metrics for the plurality of processors differ by less than the performance metric accuracy threshold.

7. A non-transitory memory storing computer executable instructions which when executed by a microprocessor of a computer systems configure the computer system to execute a process comprising the steps of:
   receiving upon the computer system a command to render a graphic primitive, the command specifying a type of the graphic primitive and values of one or more parameters of the graphic primitive;

determining whether a threshold parameter value exists with respect to a parameter of the one or more parameters of the graphic primitive;

upon a positive determination that the threshold parameter value exists with respect to a parameter of the one or more parameters of the graphic primitive determining whether a value of the parameter for which the threshold parameter value exists exceeds the threshold parameter value; and upon determining the value of the parameter for which the threshold parameter value exists exceeds the threshold parameter value selecting a processor of the pair of processors for generating the graphic primitive; and upon determining the value of the parameter for which the threshold parameter value exists does not exceed the threshold parameter value selecting the other processor of the pair of processors for generating the graphic primitive; wherein the computer system comprises the pair of processors;

the threshold parameter value of the parameter of the one or more parameters of the graphic primitive was established by executing, upon the computer system, a performance benchmarking process, the performance benchmarking process comprising:

generating the graphic primitive multiple times with the pair of processors of the computer system whilst varying the parameter of the one or more parameters of the graphic primitive in order to determine the threshold parameter value of the parameter of the one or more parameters of the graphic primitive; and storing the threshold parameter value of the parameter of the one or more parameters of the graphic primitive and the parameter of the one or more parameters of the graphic primitive threshold value within a memory accessible to the computer system; wherein below the threshold value the other processor of the pair of processors outperforms the processor of the pair of processors and above the threshold value the processor of the pair of processors outperforms the other processor of the pair of processors; and the determination of whether one of the processor of the pair of processors and the other processor of the pair of processors outperforms the one of the other processor of the pair of processors and the processor of the pair of processors is established in dependence upon a performance metric for generating and rendering the graphic primitive for a value of the parameter value.

8. The memory according to claim 7, wherein
at least one of:
the processor of the pair of processors and the other processor of the pair of processors are different processor types; and
the microprocessor is one of the processor of the pair of processors and the other processor of the pair of processors.

9. The memory of claim 7, wherein
the threshold parameter value is defined in dependence upon a value of the parameter of the one or more parameters at which the pair of processors demonstrate values of a performance metric differing by less than a performance metric accuracy threshold.

10. The memory according to claim 7, wherein
the graphic primitive is one of:
a brushstroke within the graphic-rendering application;
rendering a paint layer within the graphic-rendering application using a shading algorithm;
combining layered images within the graphic rendering application for rendering;
a digital image filter;
a digital image effect; and
a texture synthesis.

11. The memory according to claim 7, wherein
the performance benchmarking process further comprises:
terminating the performance benchmarking process upon a terminating condition being met;
the sets of parameters for each iteration are established in dependence upon the performance metrics for the plurality of processors such that the performance benchmarking process iterates towards a common performance metric for the plurality of processors; and
the terminating condition is a maximum number of iterations.

12. The memory according to claim 7, wherein
the performance benchmarking process further comprises:
terminating the performance benchmarking process upon a terminating condition being met;
the sets of parameters for each iteration are established in dependence upon the performance metrics for the plurality of processors such that the performance benchmarking process iterates towards a common performance metric for the plurality of processors; and
the terminating condition is the performance metrics for the plurality of processors differ by less than the performance metric accuracy threshold.

13. A method, comprising:
receiving upon a computer system comprising a pair of processors a command to render a graphic primitive, the command specifying a type of the graphic primitive and values of one or more parameters of the graphic primitive;

determining whether a threshold parameter value exists with respect to a parameter of the one or more parameters of the graphic primitive;

upon a positive determination that the threshold parameter value exists with respect to a parameter of the one or more parameters of the graphic primitive determining whether a value of the parameter for which the threshold parameter value exists exceeds the threshold parameter value; and upon determining the value of the parameter for which the threshold parameter value exists exceeds the threshold parameter value selecting a processor of the pair of processors for generating the graphic primitive; and upon determining the value of the parameter for which the threshold parameter value exists does not exceed the threshold parameter value selecting the other processor of the pair of processors for generating the graphic primitive; wherein the threshold parameter value of the parameter of the one or more parameters of the graphic primitive was established by executing, upon the computer system, a performance benchmarking process, the performance benchmarking process comprising:

generating the graphic primitive multiple times whilst varying the one or more other parameters of the graphic primitive in order to determine one or more other threshold values of the one or more other parameters of graphic primitive at which the pair of processors demonstrate values of a performance metric differing by less than a performance metric accuracy threshold; and the parameter of the one or more parameters of the graphic primitive is one of the one or more other parameters of the graphic primitive.

14. A non-transitory memory storing computer executable instructions which when executed by a microprocessor of a computer systems configure the computer system to execute a process comprising the steps of:
  receiving upon the computer system a command to render a graphic primitive, the command specifying a type of the graphic primitive and values of one or more parameters of the graphic primitive;
  determining whether a threshold parameter value exists with respect to a parameter of the one or more parameters of the graphic primitive;
  upon a positive determination that the threshold parameter value exists with respect to a parameter of the one or more parameters of the graphic primitive determining whether a value of the parameter for which the threshold parameter value exists exceeds the threshold parameter value; and
  upon determining the value of the parameter for which the threshold parameter value exists exceeds the threshold parameter value selecting a processor of the pair of processors for generating the graphic primitive; and
  upon determining the value of the parameter for which the threshold parameter value exists does not exceed the threshold parameter value selecting the other processor of the pair of processors for generating the graphic primitive; wherein
the computer system comprises the pair of processors;
the threshold parameter value of the parameter of the one or more parameters of the graphic primitive was established by executing, upon the computer system, a performance benchmarking process, the performance benchmarking process comprising:
  generating the graphic primitive multiple times whilst varying the one or more other parameters of the graphic primitive in order to determine one or more other threshold values of the one or more other parameters of graphic primitive at which the pair of processors demonstrate values of a performance metric differing by less than a performance metric accuracy threshold; and
the parameter of the one or more parameters of the graphic primitive is one of the one or more other parameters of the graphic primitive.

* * * * *